US012412968B2

(12) United States Patent
Uemichi

(10) Patent No.: US 12,412,968 B2
(45) Date of Patent: Sep. 9, 2025

(54) DIGITAL PHASE SHIFT CIRCUIT AND DIGITAL PHASE SHIFTER

(71) Applicant: Fujikura Ltd., Tokyo (JP)

(72) Inventor: Yusuke Uemichi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 18/018,194

(22) PCT Filed: Aug. 8, 2022

(86) PCT No.: PCT/JP2022/030256
§ 371 (c)(1),
(2) Date: Jan. 26, 2023

(87) PCT Pub. No.: WO2023/119713
PCT Pub. Date: Jun. 29, 2023

(65) Prior Publication Data
US 2024/0275010 A1 Aug. 15, 2024

(30) Foreign Application Priority Data
Dec. 24, 2021 (JP) ................................ 2021-211357

(51) Int. Cl.
*H01P 1/18* (2006.01)

(52) U.S. Cl.
CPC .................................. *H01P 1/184* (2013.01)

(58) Field of Classification Search
USPC ........................................................ 333/164
See application file for complete search history.

(56) References Cited

U.S. PATENT DOCUMENTS

| | | | |
|---|---|---|---|
| 6,816,031 B1 | 11/2004 | Miller | |
| 2019/0158068 A1 | 5/2019 | Valdes Garcia et al. | |

FOREIGN PATENT DOCUMENTS

| | | | |
|---|---|---|---|
| CN | 106785250 A | 5/2017 | |
| CN | 109616723 A | 4/2019 | |
| CN | 111326839 A | 6/2020 | |
| JP | 2011-259215 A | 12/2011 | |

(Continued)

OTHER PUBLICATIONS w/Japanese International Search Report dated Oct. 4, 2022, issued in counterpart International Application No. PCT/JP2022/030256. (3 pages).

(Continued)

*Primary Examiner* — Andrea Lindgren Baltzell
*Assistant Examiner* — Abigail Amir Yaldo
(74) *Attorney, Agent, or Firm* — WHDA, LLP

(57) ABSTRACT

A digital phase shift circuit includes a signal line extending in a predetermined direction, two inner lines arranged to be separated from the signal line by a predetermined distance at both one side and the other side of the signal line, two outer lines provided at positions farther from the signal line than the inner lines at both the one side and the other side of the signal line, a first ground conductor electrically connected to one ends of the inner lines and the outer lines in the predetermined direction, and a second ground conductor electrically connected to the other ends of the outer lines in the predetermined direction. On both or one of the first ground conductor and the second ground conductor, a region between the outer line and the inner line is formed in a multilayer structure.

8 Claims, 7 Drawing Sheets

(56) References Cited

FOREIGN PATENT DOCUMENTS

JP 2016-158035 A 9/2016

OTHER PUBLICATIONS

Tousi et al., "A Ka-band Digitally-Controlled Phase Shifter with sub-degree Phase Precision", 2016 IEEE Radio Frequency Integrated Circuits Symposium, pp. 356-359. Cited in Specification. (4 pages).

Yishay Roee Ben et al., "PVT Robust Passive Phase Shifter for 5G MIMO Applications", 2020 IEEE 20th Topical Meeting On Silicon Monolithic Integrated Circuits in RF Systems (SIRF), IEEE, Jan. 26, 2020 (Jan. 26, 2020), pp. 13-15; cited in European Search Report dated Feb. 21, 2024.

DIGITAL PHASE SHIFT CIRCUIT AND DIGITAL PHASE SHIFTER

TECHNICAL FIELD

The present invention relates to a digital phase shift circuit and a digital phase shifter.

Priority is claimed on Japanese Patent Application No. 2021-211357, filed Dec. 24, 2021, the content of which is incorporated herein by reference.

BACKGROUND ART

A digitally controlled phase shift circuit (a digital phase shift circuit) targeting high-frequency signals such as microwaves, sub-millimeter waves, or millimeter waves is disclosed (for example, see the following Non-Patent Document 1). The digital phase shift circuit includes a signal line, inner lines, outer lines, a first ground conductor, a second ground conductor, and a plurality of electronic switches.

The signal line is arranged to extend in a predetermined direction. The inner lines are arranged to be separated from the signal line at one side and the other side of the signal line. The outer lines are provided at positions farther from the signal line than the inner lines at the one side and the other side of the signal line. The first ground conductor is electrically connected to one end of each of the inner lines and the outer lines. The second ground conductor is electrically connected to the other ends of the outer lines. The electronic switches are provided between the other ends of the inner lines and the second ground conductor.

The above-described digital phase shift circuit switches the operation mode to one of a low-delay mode and a high-delay mode by switching the state of each of the plurality of electronic switches to a closed state or an open state so that a phase shift amount of a high-frequency signal that flows through the signal line is controlled. The low-delay mode is an operation mode in which a return current flows through a pair of inner lines. The high-delay mode is an operation mode in which a return current flows through a pair of outer lines.

CITATION LIST

Non-Patent Document

[Non-Patent Document 1]

A Ka-band Digitally-Controlled Phase Shifter with Sub-degree Phase Precision (2016, IEEE, RFIC)

SUMMARY OF INVENTION

Technical Problem

The loss of a high-frequency signal in the high-delay mode is greater than that in the low-delay mode. Therefore, in a digital phase shifter in which a plurality of digital phase shift circuits are connected in cascade, the loss of the high-frequency signal may increase in a condition in which the phase shift amount is large. That is, the signal amplitude of the high-frequency signal may change with the phase shift amount.

The present invention is made in view of the above-described circumstances and an objective of the present invention is to provide a digital phase shift circuit and a digital phase shifter capable of reducing a difference between the loss of a high-frequency signal in a high-delay mode and the loss of a high-frequency signal in a low-delay mode.

Solution to Problem

According to an aspect of the present invention, there is provided a digital phase shift circuit including: a signal line extending in a predetermined direction; two inner lines arranged to be separated from the signal line by a predetermined distance at both one side and the other side of the signal line; two outer lines provided at positions farther from the signal line than the inner lines at both the one side and the other side of the signal line; a first ground conductor electrically connected to one ends of the inner lines and the outer lines in the predetermined direction; a second ground conductor electrically connected to the other ends of the outer lines in the predetermined direction; a first electronic switch connected between the other end of the inner line at the one side in the predetermined direction and the second ground conductor; and a second electronic switch connected between the other end of the inner line at the other side in the predetermined direction and the second ground conductor, wherein at least one of a region between the outer line and the inner line on both or one of the first ground conductor and the second ground conductor and a region on the outer line is formed in a multilayer structure.

According to the above-described configuration, it is possible to reduce a difference between the loss of a high-frequency signal in a high-delay mode and the loss of a high-frequency signal in a low-delay mode.

Also, according to an aspect of the present invention, the region between the outer line and the inner line on both or one of the first ground conductor and the second ground conductor may be formed in a multilayer structure, and the inner lines, the outer lines, and uppermost layer of both or one of the first ground conductor and the second ground conductor of the multilayer structure may be connected in the same layer.

Also, according to an aspect of the present invention, a width of the outer line may be wider than a width of the inner line.

Also, according to an aspect of the present invention, the region on the outer line is formed in a multilayer structure.

Also, according to an aspect of the present invention, the first electronic switch and the second electronic switch may be field effect transistors, and a size of the field effect transistor may be greater than or equal to a sum of a width of the first ground conductor and a width of the second ground conductor.

Also, according to an aspect of the present invention, the digital phase shift circuit may include a third electronic switch connected between the signal line and the first ground conductor or the second ground conductor.

Also, according to an aspect of the present invention, the digital phase shift circuit may include a capacitor connected between the signal line and the first ground conductor or the second ground conductor and a fourth electronic switch connected in series to the capacitor between the signal line and the second ground conductor.

Also, according to an aspect of the present invention, there is provided a digital phase shifter in which a plurality of digital phase shift circuits, each of which is described above, are connected in cascade and the plurality of digital phase shift circuits connected in cascade perform a phase shift process for a signal of a frequency band from a first frequency to a second frequency higher than the first frequency, wherein the digital phase shift circuit may operate in an operation mode that is one of a low-delay mode in which the first electronic switch and the second electronic switch are set in a closed state and a high-delay mode in which the first electronic switch and the second electronic switch are set in an open state, and wherein, in delay control states for operating each of the plurality of digital phase shift circuits connected in cascade in the high-delay mode or the low-delay mode, a magnitude relationship between signal amplitudes of the delay control states may be different between a case where the frequency of the signal is the first frequency and a case where the frequency of the signal is the second frequency.

Also, according to an aspect of the present invention, there is provided a digital phase shifter in which a plurality of digital phase shift circuits, each of which is described above, are connected in cascade and the plurality of digital phase shift circuits connected in cascade perform a phase shift process for a signal of a frequency band from a first frequency to a second frequency higher than the first frequency, wherein the digital phase shift circuit may operate in an operation mode that is one of a low-delay mode in which the first electronic switch and the second electronic switch are set in a closed state and a high-delay mode in which the first electronic switch and the second electronic switch are set in an open state, and wherein a magnitude relationship between an amplitude of the signal when all the digital phase shift circuits are in the low-delay mode and an amplitude of the signal when all the digital phase shift circuits are in the high-delay mode may be different between a case where the frequency of the signal is the first frequency and a case where the frequency of the signal is the second frequency.

Advantageous Effects of Invention

As described above, according to the present invention, it is possible to provide a digital phase shift circuit and a digital phase shifter capable of reducing a difference between the loss of a high-frequency signal in a high-delay mode and the loss of a high-frequency signal in a low-delay mode.

DESCRIPTION OF EMBODIMENTS

Hereinafter, a digital phase shift circuit according to the present embodiment will be described with reference to the drawings.

Figure 1:
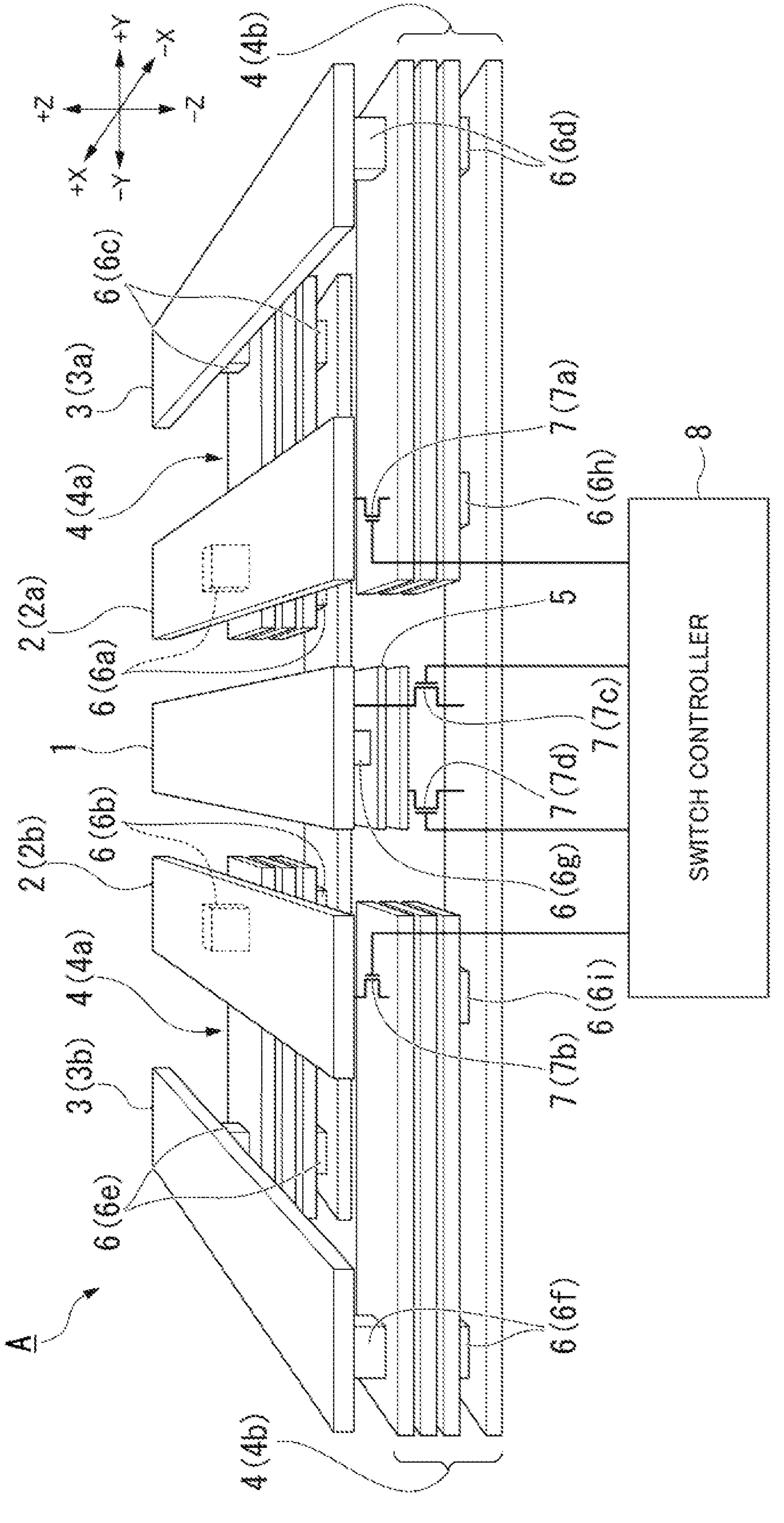
FIG. 1 is a perspective view of a digital phase shift circuit according to the present embodiment.

FIG. 1 is a perspective view of a digital phase shift circuit according to the present embodiment. As shown in FIG. 1, the digital phase shift circuit A of the present embodiment includes a signal line 1, two inner lines 2 (a first inner line 2*a* and a second inner line 2*b*), two outer lines 3 (a first outer line 3*a* and a second outer line 3*b*), two ground conductors 4 (a first ground conductor 4*a* and a second ground conductor 4*b*), a capacitor 5, a plurality of connection conductors 6, four electronic switches 7 (a first electronic switch 7*a*, a second electronic switch 7*b*, a third electronic switch 7*c*, and a fourth electronic switch 7*d*), and a switch controller 8.

The signal line 1 is a linear belt-shaped conductor extending in a predetermined direction. That is, the signal line 1 is a long plate-shaped conductor having a certain width, a certain thickness, and a predetermined length. In the example shown in FIG. 1, a signal S flows from the front side to the back side through the signal line 1. The signal S is a high-frequency signal having a frequency band such as microwave, sub-millimeter wave, or millimeter wave.

A forward/backward direction shown in FIG. 1 is referred to as an X-axis direction, a left/right direction shown in FIG. 1 is referred to as a Y-axis direction, and an upward/downward direction (a vertical direction) shown in FIG. 1 is referred to as a Z-axis direction. Also, a +X-direction is a direction from the front side to the back side in the X-axis direction and a −X-direction is a direction directed opposite to the +X-direction. A +Y direction is a direction directed rightward in the Y-axis direction, and a −Y direction is a direction directed opposite to the +Y direction. A +Z direction is a direction directed upward in the Z-axis direction, and a −Z direction is a direction directed opposite to the +Z direction.

The first inner line 2*a* is a linear belt-shaped conductor. That is, the first inner line 2*a* is a long plate-shaped conductor having a certain width, a certain thickness, and a predetermined length. The first inner line 2*a* extends in a direction that is the same as an extension direction of the signal line 1. The first inner line 2*a* is provided parallel to the signal line 1 and is separated from the signal line 1 by a predetermined distance. Specifically, the first inner line 2*a* is arranged to be separated from the signal line 1 by a predetermined distance at one side of the signal line 1. In other words, the first inner line 2*a* is arranged to be separated from the signal line 1 by the predetermined distance in the +Y-axis direction (the +Y-direction).

The second inner line 2*b* is a linear belt-shaped conductor. That is, the second inner line 2*b* is a long plate-shaped conductor having a certain width, a certain thickness, and a predetermined length like the first inner line 2*a*. The second inner line 2*b* extends in a direction that is the same as the extension direction of the signal line 1. The second inner line 2*b* is provided parallel to the signal line 1 and is separated from the signal line 1 by a predetermined distance. Specifically, the second inner line 2*b* is arranged to be separated from the signal line 1 by the predetermined distance at the other side of the signal line 1. In other words, the second inner line 2*b* is arranged to be separated from the signal line 1 by the predetermined distance in the −Y-axis direction (the −Y-direction).

The first outer line 3*a* is a linear belt-shaped conductor provided at a position farther from the signal line 1 than the first inner line 2*a* at one side of the signal line 1. That is, the first outer line 3*a* is a linear belt-shaped conductor arranged further in the +Y-direction than the first inner line 2*a*. The first outer line 3*a* is a long plate-shaped conductor having a certain width, a certain thickness, and a predetermined length. The first outer line 3*a* is provided parallel to the signal line 1 at an interval of a predetermined distance from the signal line 1 in a state in which the first inner line 2*a* is sandwiched between the first outer line 3*a* and the signal line 1. The first outer line 3*a* extends in a direction that is the same as the extension direction of the signal line 1 like the first inner line 2*a* and the second inner line 2*b*.

The second outer line 3*b* is a linear belt-shaped conductor provided at a position farther from the signal line 1 than the second inner line 2*b* at the other side of the signal line 1. That is, the second outer line 3*b* is a linear belt-shaped conductor arranged further in the −Y-direction than the second inner line 2*b*. The second outer line 3*b* is a long plate-shaped conductor having a certain width, a certain thickness, and a predetermined length like the first outer line 3*a*. The second outer line 3*b* is provided parallel to the signal line 1 at an interval of the predetermined distance from the signal line 1 in a state in which the second inner line 2*b* is sandwiched between the second outer line 3*b* and the signal line 1. The second outer line 3*b* extends in a direction that is the same as the extension direction of the signal line 1 like the first inner line 2*a* and the second inner line 2*b*.

The first ground conductor 4*a* is a linear belt-shaped conductor provided at one end side (one end side in the X-axis direction) of each of the first inner line 2*a*, the second inner line 2*b*, the first outer line 3*a*, and the second outer line 3*b*. The first ground conductor 4*a* is electrically connected to one end of each of the first inner line 2*a*, the second inner line 2*b*, the first outer line 3*a*, and the second outer line 3*b*. The first ground conductor 4*a* is a long plate-shaped conductor having a certain width, a certain thickness, and a predetermined length.

The first ground conductor 4*a* is provided orthogonal to the first inner line 2*a*, the second inner line 2*b*, the first outer line 3*a*, and the second outer line 3*b* that extend in the same direction. That is, the first ground conductor 4*a* is arranged to extend in the Y-axis direction. The first ground conductor 4*a* is provided below the first inner line 2*a*, the second inner line 2*b*, the first outer line 3*a*, and the second outer line 3*b* with separated by a predetermined distance.

In the example shown in FIG. 1, the first ground conductor 4*a* is set such that one end that is an end in the +Y direction of the first ground conductor 4*a* is located at substantially the same position as a right side edge portion of the first outer line 3*a*. In the example shown in FIG. 1, the first ground conductor 4*a* is set such that the other end that is an end in the −Y direction of the first ground conductor 4*a* is located at substantially the same position as a left side edge portion of the second outer line 3*b*.

The second ground conductor 4*b* is a linear belt-shaped conductor provided at the other end side (the other end side in the X-axis direction) of each of the first inner line 2*a*, the second inner line 2*b*, the first outer line 3*a*, and the second outer line 3*b*. The second ground conductor 4*b* is a long plate-shaped conductor having a certain width, a certain thickness, and a predetermined length like the first ground conductor 4*a*.

The second ground conductor 4*b* is arranged parallel to the first ground conductor 4*a* and is provided orthogonal to the first inner line 2*a*, the second inner line 2*b*, the first outer line 3*a*, and the second outer line 3*b* like the first ground conductor 4*a*. The second ground conductor 4*b* is provided below the first inner line 2*a*, the second inner line 2*b*, the first outer line 3*a*, and the second outer line 3*b* with separated by a predetermined distance.

The second ground conductor 4*b* is provided such that one end that is an end in the +Y direction of the second ground conductor 4*b* is located at substantially the same position as a right side edge portion of the first outer line 3*a*. The second ground conductor 4*b* is set such that the other end that is an end in the −Y direction of the second ground conductor 4*b* is located at substantially the same position as a left side edge portion of the second outer line 3*b*. In the example shown in FIG. 1, the second ground conductor 4*b* is located at the same position as the first ground conductor 4*a* in the Y-axis direction.

In the example shown in FIG. 1, a multilayer structure is formed in regions between the outer lines 3 and the inner lines 2 on the first ground conductor 4*a* and the second ground conductor 4*b*. Further, the regions between the outer lines 3 and the inner lines 2 include a region between the first outer line 3*a* and the first inner line 2*a*, and a region between the second outer line 3*b* and the second inner line 2*b*.

However, the present invention is not limited thereto, and a multilayer structure may be formed between the outer lines 3 and the inner lines 2 on only one of the first ground conductor 4*a* and the second ground conductor 4*b*. When the first ground conductor 4*a* is formed in the multilayer structure, the layers thereof are connected to each other through via holes. Similarly, when the second ground conductor 4*b* is formed in the multilayer structure, the layers thereof are connected to each other through via holes (for example, connection conductor 6*h* or 6*i*, which are described below).

The capacitor 5 is provided between the signal line 1 and the first ground conductor 4*a* or the second ground conductor 4*b*. For example, the capacitor 5 includes an upper electrode connected to the signal line 1 and a lower electrode electrically connected to the fourth electronic switch 7*d*. For example, the capacitor 5 is a thin film capacitor formed in a metal insulator metal (MIM) structure. Further, the capacitor 5 may be a parallel plate type capacitor or may be an opposite comb type capacitor (an interdigital capacitor).

The connection conductors 6 include at least the connection conductors 6*a* to 6*i*. The connection conductor 6*a* is a conductor configured to electrically and mechanically connect one end of the first inner line 2*a* and the first ground conductor 4*a*. For example, the connection conductor 6*a* is a conductor extending in the Z-axis direction, and has one end (an upper end) connected to a lower surface of the first inner line 2*a* and the other end (a lower end) connected to an upper surface of the first ground conductor 4*a*. In addition, the connection conductor 6*a* connects the first ground conductor 4*a* formed in the multilayer structure between the first inner line 2*a* and the first outer line 3*a* (connects the layers that form the first ground conductor 4*a*).

The connection conductor 6*b* is a conductor configured to electrically and mechanically connect one end of the second inner line 2*b* and the first ground conductor 4*a*. For example, the connection conductor 6*b* is a conductor extending in the Z-axis direction like the connection conductor 6*a*, and has one end (an upper end) connected to a lower surface of the second inner line 2*b* and the other end (a lower end) connected to an upper surface of the first ground conductor 4*a*. In addition, the connection conductor 6*b* connects the first ground conductor 4*a* formed in the multilayer structure between the second inner line 2*b* and the second outer line 3*b* (connects the layers that form the first ground conductor 4*a*).

The connection conductor 6*c* is a conductor configured to electrically and mechanically connect one end of the first outer line 3*a* and the first ground conductor 4*a*. For example, the connection conductor 6*c* is a conductor extending in the Z-axis direction, and has one end (an upper end) connected to a lower surface in one end of the first outer line 3*a* and the other end (a lower end) connected to an upper surface of the first ground conductor 4*a*. In addition, the connection conductor 6*e* connects the first ground conductor 4*a* formed in the multilayer structure between the first inner line 2*a* and the first outer line 3*a* (connects the layers that form the first ground conductor 4*a*).

The connection conductor 6*d* is a conductor configured to electrically and mechanically connect the other end of the first outer line 3*a* and the second ground conductor 4*b*. For example, the connection conductor 6*d* is a conductor extending in the Z-axis direction, and has one end (an upper end) connected to a lower surface in the other end of the first outer line 3*a* and the other end (a lower end) connected to an upper surface of the second ground conductor 4*b*. In addition, the connection conductor 6*d* connects the second ground conductor 4*b* formed in the multilayer structure between the first inner line 2*a* and the first outer line 3*a* (connects the layers that form the second ground conductor 4*b*).

The connection conductor 6*e* is a conductor configured to electrically and mechanically connect one end of the second outer line 3*b* and the first ground conductor 4*a*. For example, the connection conductor 6*e* is a conductor extending in the Z-axis direction, and has one end (an upper end) connected to a lower surface in one end of the second outer line 3*b* and the other end (a lower end) connected to an upper surface of the first ground conductor 4*a*. In addition, the connection conductor 6*e* connects the first ground conductor 4*a* formed in the multilayer structure between the second inner line 2*b* and the second outer line 3*b* (connects the layers that form the first ground conductor 4*a*).

The connection conductor 6*f* is a conductor configured to electrically and mechanically connect the other end of the second outer line 3*b* and the second ground conductor 4*b*. For example, the connection conductor 6*f* is a conductor extending in the Z-axis direction, and has one end (an upper end) connected to a lower surface in the other end of the second outer line 3*b* and the other end (a lower end) connected to an upper surface of the second ground conductor 4*b*. In addition, the connection conductor 6*f* connects the second ground conductor 4*b* formed in the multilayer structure between the second inner line 2*b* and the second outer line 3*b* (connects the layers that form the second ground conductor 4*b*).

The connection conductor 6*g* is a conductor configured to electrically and mechanically connect the other end of the signal line 1 and the upper electrode of the capacitor 5. For example, the connection conductor 6*g* is a conductor extending in the Z-axis direction, and has one end (an upper end) connected to a lower surface in the other end of the signal line 1 and the other end (a lower end) connected to the upper electrode of the capacitor 5.

The connection conductor 6*h* and the connection conductor 6*i* connect the second ground conductor 4*b* formed in the multilayer structure. That is, each of the connection conductor 6*h* and the connection conductor 6*i* connects the layers that form the second ground conductor 4*b*. The connection conductor 6*h* connects the second ground conductor 4*b* in the multilayer structure further in the +Y direction than the signal line 1. The connection conductor 6*i* connects the second ground conductor 4*b* in the multilayer structure further in the −Y direction than the signal line 1.

The first electronic switch 7*a* is connected to the other end of the first inner line 2*a* and the second ground conductor 4*b* therebetween. The first electronic switch 7*a* is, for example, a metal oxide semiconductor field effect transistor (MOSFET), and includes a drain terminal electrically connected to the other end of the first inner line 2*a*, a source terminal electrically connected to the second ground conductor 4*b* and a gate terminal electrically connected to the switch controller 8. In the example shown in FIG. 1, the source terminal of the first electronic switch 7*a* is connected to an uppermost layer of the second ground conductor 4*b* in the multilayer structure. However, the present invention is not limited thereto, and the source terminal of the first electronic switch 7*a* may be connected to at least one layer of the second ground conductor 4*b* in the multilayer structure.

The first electronic switch 7*a* is controlled to a closed state or an open state based on the gate signal input to the gate terminal from the switch controller 8. The closed state is a state in which the drain terminal and the source terminal are conducted. The open state is a state in which the drain terminal and the source terminal are not conducted and the electrical connection thereof is disconnected. The first electronic switch 7*a* is switched to a conduction state in which the other end of the first inner line 2*a* and the second ground conductor 4*b* are electrically connected or a disconnection state in which the electrical connection therebetween is disconnected under control of the switch controller 8.

The second electronic switch 7*b* is connected to the other end of the second inner line 2*b* and the second ground conductor 4*b* therebetween. The second electronic switch 7*b* is, for example, a MOSFET, and includes a drain terminal connected to the other end of the second inner line 2*b*, a source terminal connected to the second ground conductor 4*b* and a gate terminal connected to the switch controller 8. In the example shown in FIG. 1, the source terminal of the second electronic switch 7*b* is connected to an uppermost layer of the second ground conductor 4*b* in the multilayer structure. However, the present invention is not limited thereto, and the source terminal of the second electronic switch 7*b* may be connected to at least one layer of the second ground conductor 4*b* in the multilayer structure.

The second electronic switch 7*b* is controlled to a closed state or an open state based on the gate signal input to the gate terminal from the switch controller 8. The second electronic switch 7*b* is switched to a conduction state in which the other end of the second inner line 2*b* and the second ground conductor 4*b* are electrically connected or a disconnection state in which the electrical connection therebetween is disconnected under control of the switch controller 8.

The third electronic switch 7*e* is connected to the other end of the signal line 1 and the second ground conductor 4*b* therebetween. The third electronic switch 7*e* is, for example, a MOSFET, and includes a drain terminal connected to the other end of the signal line 1, a source terminal connected to the second ground conductor 4*b* and a gate terminal connected to the switch controller 8. In the example shown in FIG. 1, while the third electronic switch 7*c* is provided on the other end side of the signal line 1, the present invention is not limited thereto and may be provided on one end side of the signal line 1.

The third electronic switch 7*e* is controlled to a closed state or an open state based on the gate signal input to the gate terminal from the switch controller 8. The third electronic switch 7*e* is switched to a conduction state in which the other end of the signal line 1 and the second ground conductor 4*b* are electrically connected or a disconnection state in which the electrical connection therebetween is disconnected under control of the switch controller 8.

The fourth electronic switch 7*d* is serially connected to the capacitor 5 between the other end of the signal line 1 and the second ground conductor 4*b*. The fourth electronic switch 7*d* is, for example, a MOSFET. In the example shown in FIG. 1, the fourth electronic switch 7*d* includes a drain terminal connected to a lower electrode of the capacitor 5, a source terminal connected to the second ground conductor 4*b* and a gate terminal connected to the switch controller 8.

The fourth electronic switch 7*d* is controlled to a closed state or an open state based on the gate signal input to the gate terminal from the switch controller 8. The fourth electronic switch 7*d* is switched to a conduction state in which the lower electrode of the capacitor 5 and the second ground conductor 4*b* are electrically connected or a disconnection state in which the electrical connection therebetween is disconnected under control of the switch controller 8.

The switch controller 8 is a control circuit configured to control the first electronic switch 7*a*, the second electronic switch 7*b*, the third electronic switch 7*c* and the fourth electronic switch 7*d*, which are the electronic switches 7. For example, the switch controller 8 includes four output ports. The switch controller 8 individually controls the electronic switches 7 to an open state or a closed state by outputting individual gate signals from the individual output ports and supplying the signals to the individual gate terminals of the electronic switches 7.

Figure 2:
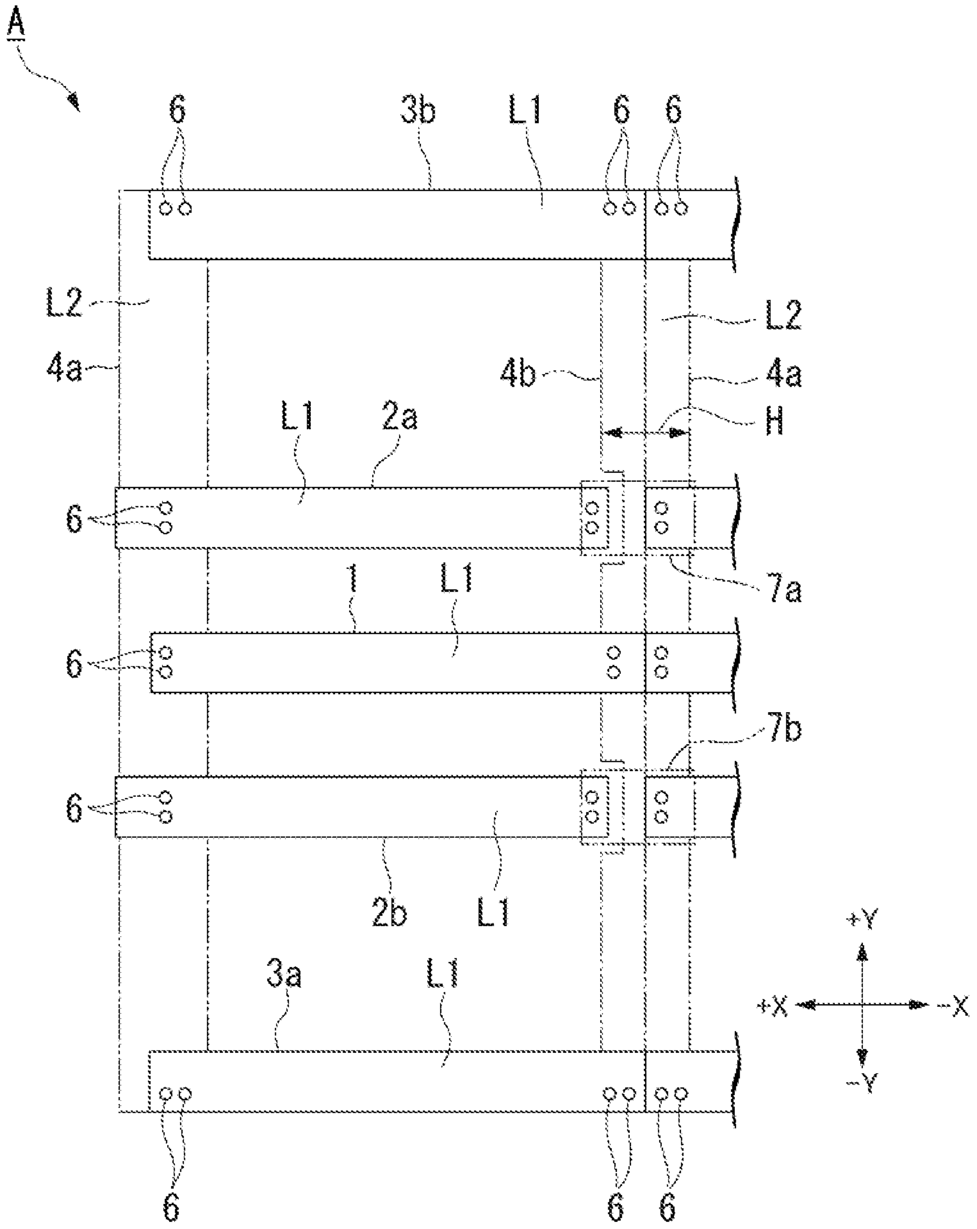
FIG. 2 is a schematic diagram of the digital phase shift circuit according to the present embodiment viewed in a +Z-direction.

A schematic diagram in which the digital phase shift circuit A is obliquely viewed so that the mechanical structure of the digital phase shift circuit A is easily understood is shown in FIG. 1, but the actual digital phase shift circuit A is formed as a multilayer structure using semiconductor manufacturing technology. FIG. 2 is a diagram of the digital phase shift circuit A of the present embodiment viewed from the +Z-direction. In the example shown in FIG. 2, the plurality of electronic switches 7 and the switch controller 8 are omitted for convenience of description.

As an example, in the digital phase shift circuit A, the signal line 1, the first inner line 2*a*, the second inner line 2*b*, the first outer line 3*a*, and the second outer line 3*b* are formed on a first conductive layer L1. The first ground conductor 4*a* and the second ground conductor 4*b* may be formed on a plurality of second conductive layers L2 facing the first conductive layer L1 with the insulating layer sandwiched therebetween. Components formed on the first conductive layer L1 and components formed on the plurality of second conductive layers 12 are connected to each other through a plurality of via holes. The plurality of connection conductors 6 correspond to the via holes embedded in the insulating layer. The positions, numbers and the like of via holes are not limited to those exemplified in FIG. 2.

The inner lines 2, the outer lines 3, and the uppermost layer of the ground conductor 4 formed in the multilayer structure may be connected in the same layer. That is, the inner lines 2, the outer lines 3, and the uppermost layer of the multiple layers constituting the ground conductor 4 may be located at the same position in the Z-axis direction and may be connected to each other. For example, the first inner line 2*a*, the first outer line 3*a*, and the uppermost layers of the first ground conductor 4*a* and the second ground conductor 4*b* formed in the multilayer structures may be connected in the same layer. The second inner line 2*b*, the second outer line 3*b*, and the uppermost layers of the first ground conductor 4*a* and the second ground conductor 4*b* having the multilayer structures may be connected in the same layer.

Figure 3:
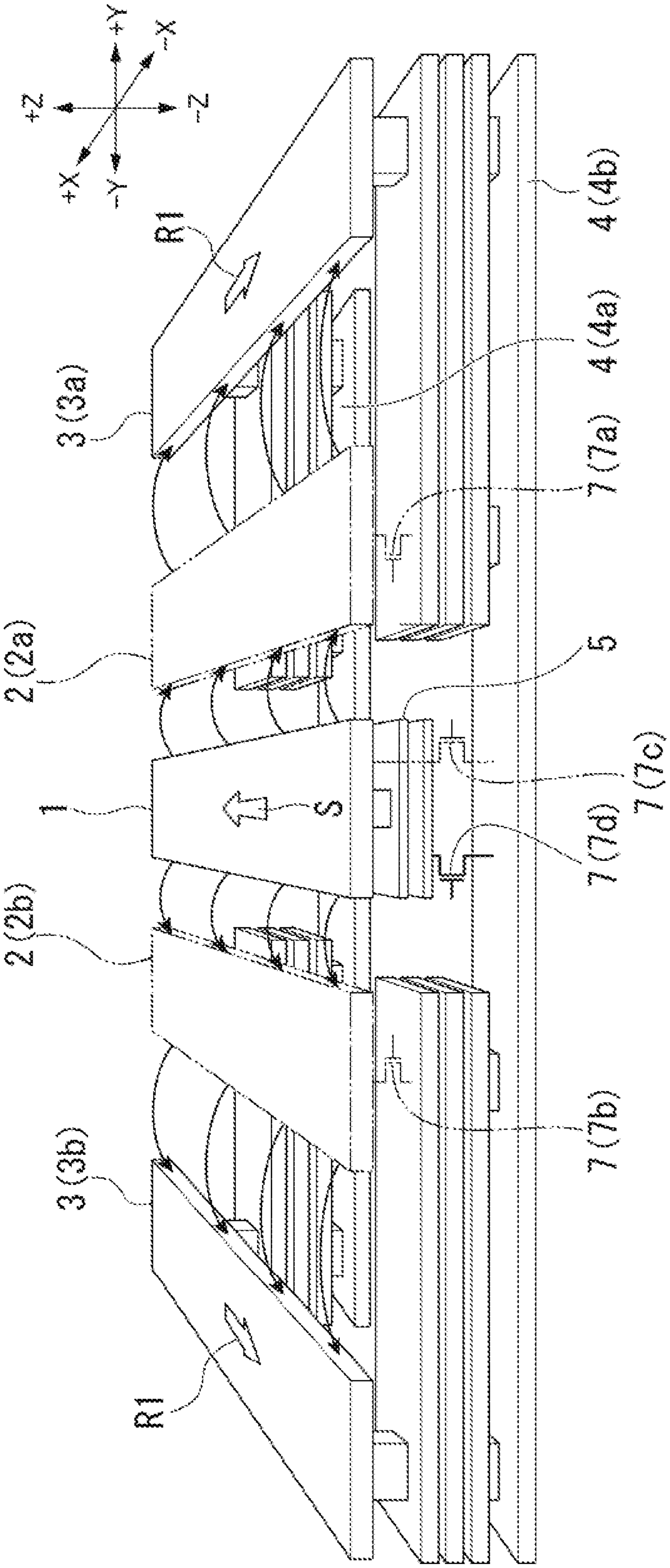
FIG. 3 is a diagram for describing a high-delay mode according to the present embodiment.

Next, the operation of the digital phase shift circuit A according to the present embodiment are described with reference to FIGS. 3 and 4. The digital phase shift circuit A has a high-delay mode and a low-delay mode as operation modes. The digital phase shift circuit A operates in the high-delay mode or the low-delay mode.

(High-Delay Mode)

The high-delay mode is a mode in which a first phase difference is generated in a signal S. As shown in FIG. 3, in the high-delay mode, the first electronic switch 7*a* and the second electronic switch 7*b* are controlled to the open state, and the fourth electronic switch 7*d* is controlled to the closed state.

When the first electronic switch 7*a* is controlled to the open state, electrical connection between the other end of the first inner line 2*a* and the second ground conductor 4*b* is disconnected. When the second electronic switch 7*b* is controlled to the open state, connection between the other end of the second inner line 2*b* and the second ground conductor 4*b* of the multilayer structure is disconnected. When the fourth electronic switch 7*d* is controlled to the closed state, the other end of the signal line 1 is connected to the second ground conductor 4*b* through the capacitor 5.

When the signal S is propagated through the signal line 1 from the input end (the other end) toward the output end (one end), a return current R1 flows from one end toward the other end in a direction opposite to the signal S (opposite to a direction in which the signal S propagates). That is, the return current R1 is a current flowing in the −X direction that is a direction opposite to the signal S flowing in the +X direction. In the high-delay mode, since the first electronic switch 7*a* and the second electronic switch 7*b* are in the open state, as shown in FIG. 3, the return current R1 mainly flows through the first outer line 3*a* and the second outer line 3*b* in the −X direction.

In the high-delay mode, since the return current R1 flows through the first outer line 3*a* and the second outer line 3*b*, an inductance value L is higher than that in the low-delay mode. In addition, since the fourth electronic switch 7*d* is in the closed state, the capacitor 5 is working. For this reason, in the high-delay mode, a delay quantity greater than that in the low-delay mode can be obtained.

(Low-Delay Mode)

The low-delay mode is a mode in which a second phase difference smaller than the first phase difference is generated in the signal S. In the low-delay mode, as shown in FIG. 4, the first electronic switch 7*a* and the second electronic switch 7*b* are controlled to the closed state, and the fourth electronic switch 7*d* is controlled to the open state.

When the first electronic switch 7*a* is controlled to the closed state, the other end of the first inner line 2*a* and the second ground conductor 4*b* are electrically connected. When the second electronic switch 7*b* is controlled to the closed state, the other end of the second inner line 2*b* and the second ground conductor 4*b* are electrically connected.

Figure 4:
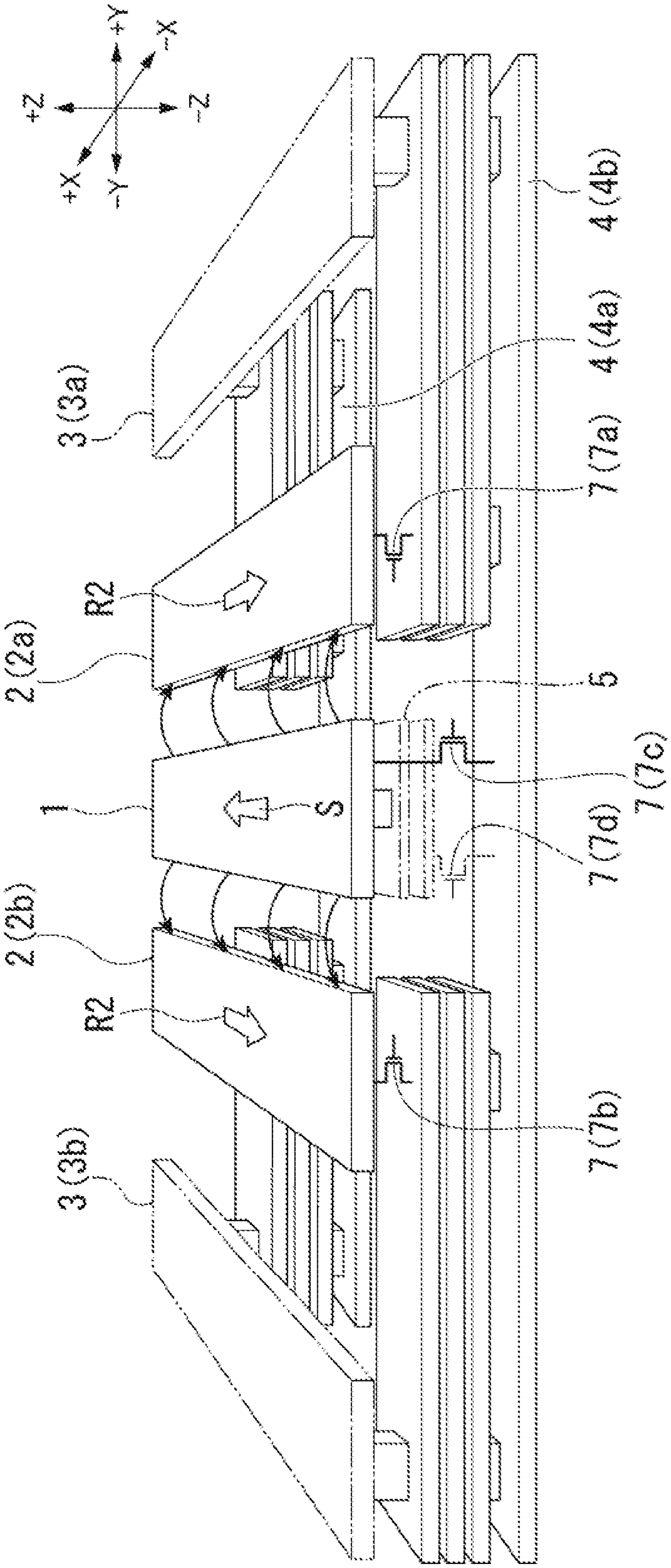
FIG. 4 is a diagram for describing a low-delay mode according to the present embodiment.

In the low-delay mode, since the first electronic switch 7*a* and the second electronic switch 7*b* are in the closed state, as shown in FIG. 4, a return current R2 mainly flows through the first inner line 2*a* and the second inner line 2*b* in the −X direction. In the low-delay mode, since the return current R2 flows through the first inner line 2*a* and the second inner line 2*b*, the inductance value L is lower than that in the high-delay mode. In addition, since the fourth electronic switch 7*d* is in the open state, the capacitor 5 is not working. For this reason, a capacitance value C is smaller than that in the high-delay mode. For this reason, a delay quantity in the low-delay mode is lower than a delay quantity in the high-delay mode.

Here, the high-delay mode has a loss of the signal S greater than that in the low-delay mode. Since the loss of the signal S in the high-delay mode is different from the loss of the signal S in the low-delay mode, the loss of the signal S (signal amplitude) may be varied according to the phase shift quantity. Therefore, in the digital phase shifter B in which a plurality of digital phase shift circuits A1 to An are connected in cascade as illustrated in FIG. 5, an event in which the loss of the signal S increases in a condition in which the phase shift amount increases may occur.

In the digital phase shift circuit A, in order to reduce the unbalance of the signal amplitude of the signal S, i.e., a difference between the loss of the signal S in the high-delay mode and the loss of the signal S in the low-delay mode, the first ground conductor 4*a* and the second ground conductor 4*b* outside of the inner lines 2 are formed in the multilayer structures as an example. According to this configuration, it is possible to reduce a resistance value of the ground conductor 4 between the outer line 3 and the inner line 2 and reduce the loss of signal S in the high-delay mode. Therefore, the signal amplitude unbalance between the high-delay mode and the low-delay mode can be reduced.

Figure 5:
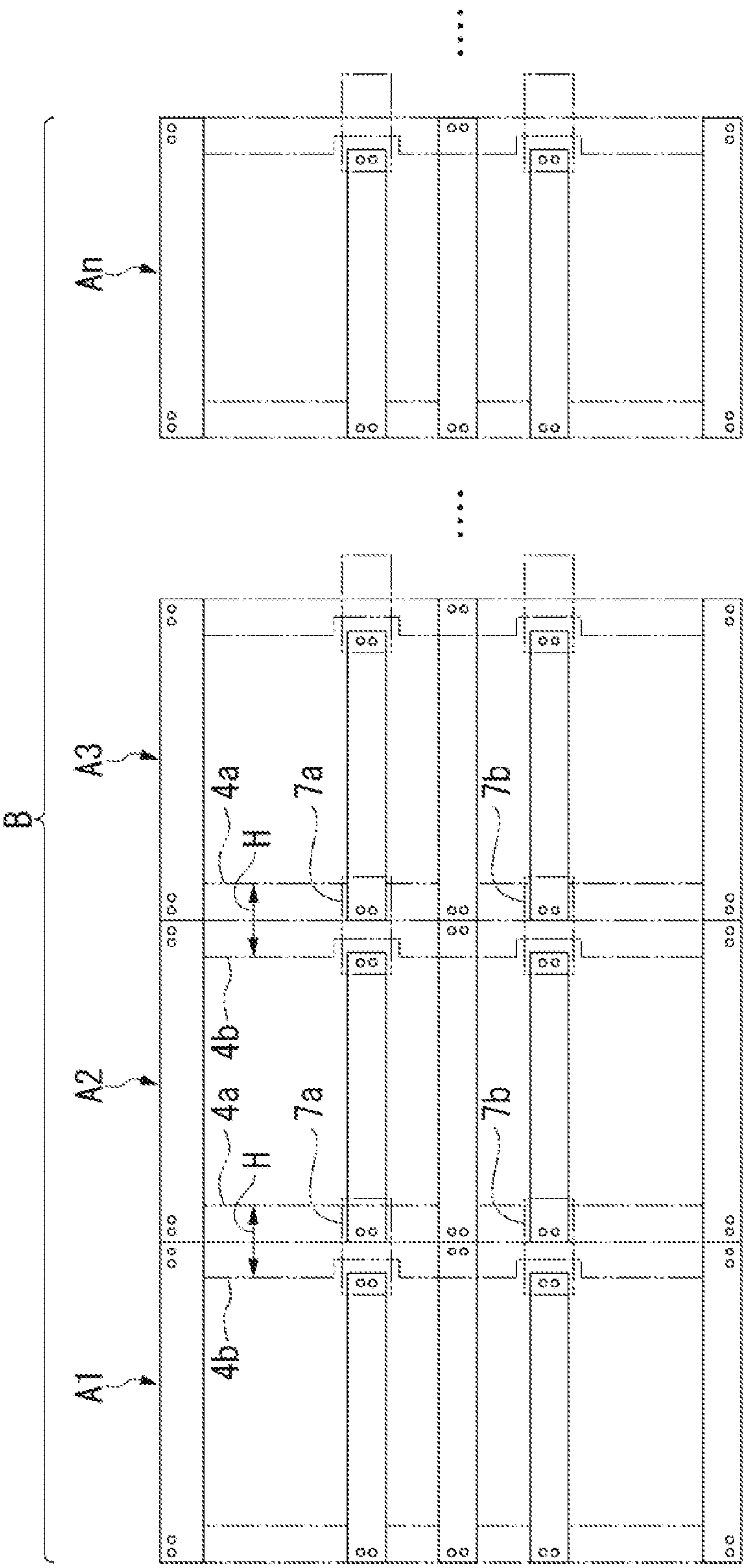
FIG. 5 is a schematic configuration diagram of a digital phase shifter according to the present embodiment.
Figure 7:
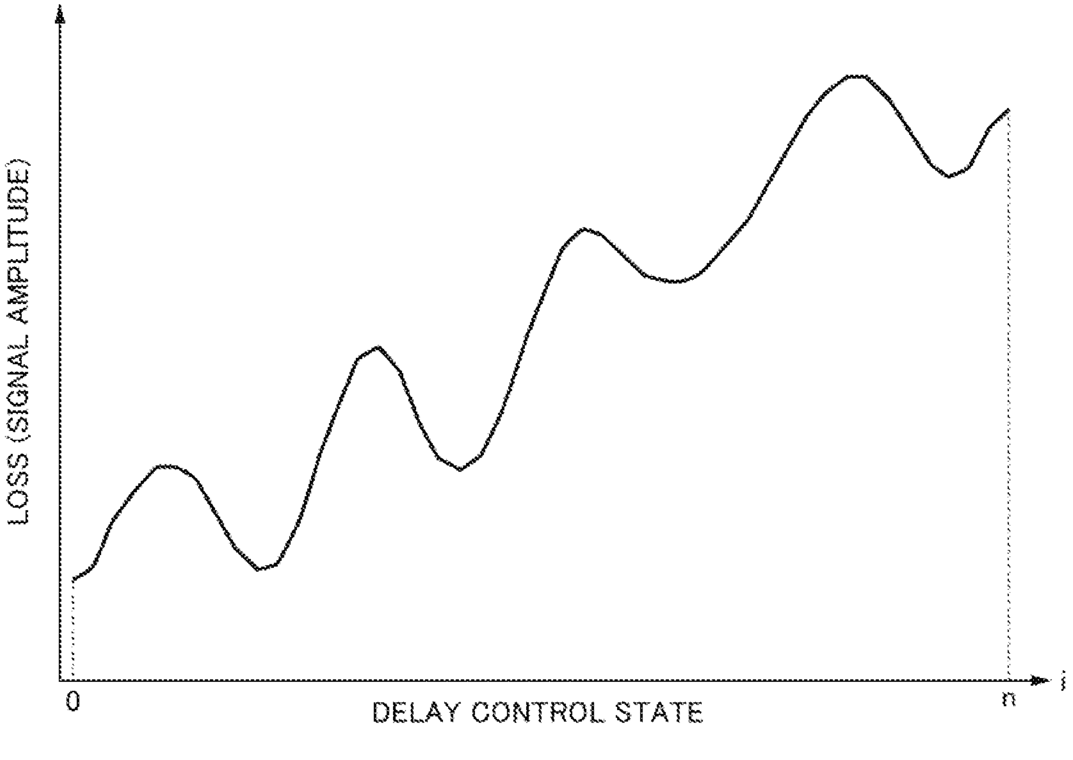
FIG. 7 is a diagram showing a signal amplitude at a second frequency in each delay control state according to the present embodiment.
Figure 8:
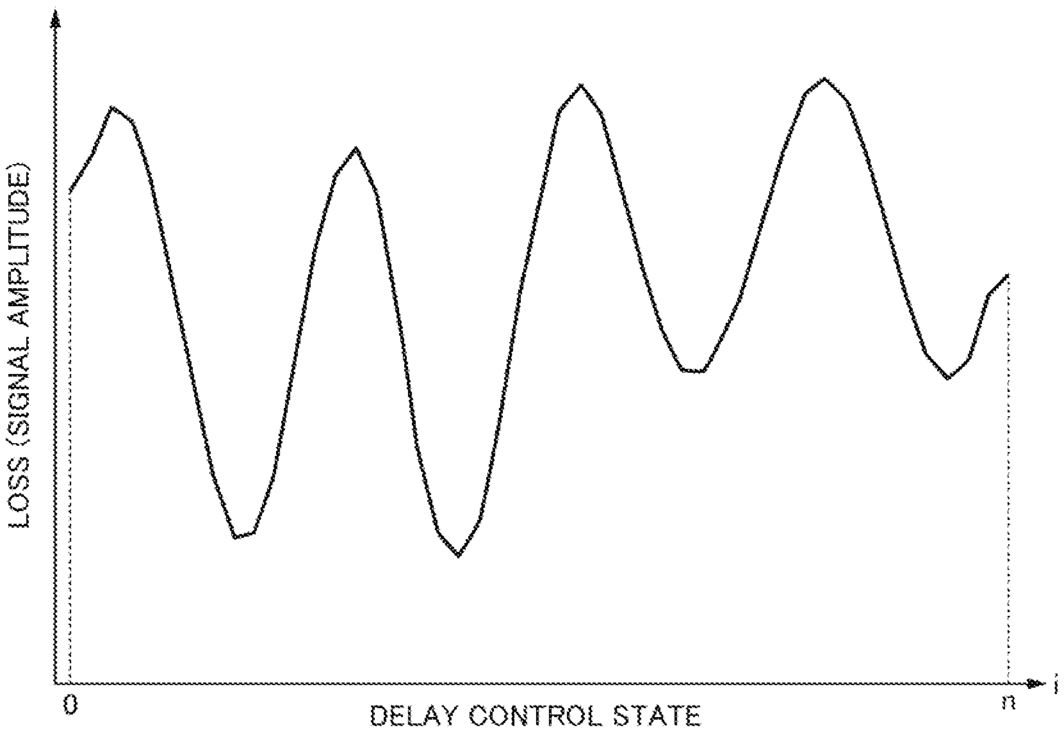
FIG. 8 is a diagram showing a signal amplitude at a center frequency of a used frequency band in each delay control state according to the present embodiment.

Next, the electrical characteristics of the digital phase shifter B according to the present embodiment as exemplified in FIG. 5 are described with reference to FIGS. 6 to 8. The digital phase shifter B includes "n" digital phase shift circuits A1 to An (n is an integer of 2 or more) connected in cascade. The digital phase shifter B performs a phase shift process for the signal S of a predetermined frequency band (hereinafter referred to as a "used frequency band") through the "n" digital phase shift circuits A1 to An connected in cascade. The range of the used frequency band is from the first frequency f1 to the second frequency f2 higher than the first frequency.

The digital phase shifter B can operate each of the "n" digital phase shift circuits A1 to An in an operation mode that is one of the low-delay mode and the high-delay mode. Therefore, the digital phase shifter B can control the delay amount of the signal S by performing a control process so that the operation mode of each of the "n" digital phase shift circuits A1 to An is the low-delay mode or the high-delay mode.

For example, the digital phase shifter B operates first to i-th digital phase shift circuits A among "n" digital phase shift circuits A connected in cascade in the low-delay mode and operates (i+1)-th to n-th digital phase shift circuits A in the high-delay mode. The digital phase shifter B can switch the delay control state by arbitrarily changing the value of "i". The delay control state is the control state of the operation mode of the "n" digital phase shift circuits A, and for example, indicates how many of the "n" digital phase shift circuits A connected in cascade from the first digital phase shift circuit is in the high-delay mode or the low-delay mode.

If "n" is 46, there are 47 delay control states of "i"=0, 1 to 46. For example, the delay control state when "i" is 0 indicates that all the "n" digital phase shift circuits A are in high-delay mode. For example, the delay control state when "i" is 46 indicates that all the "n" digital phase shift circuits A are in the low-delay mode.

Figure 6:
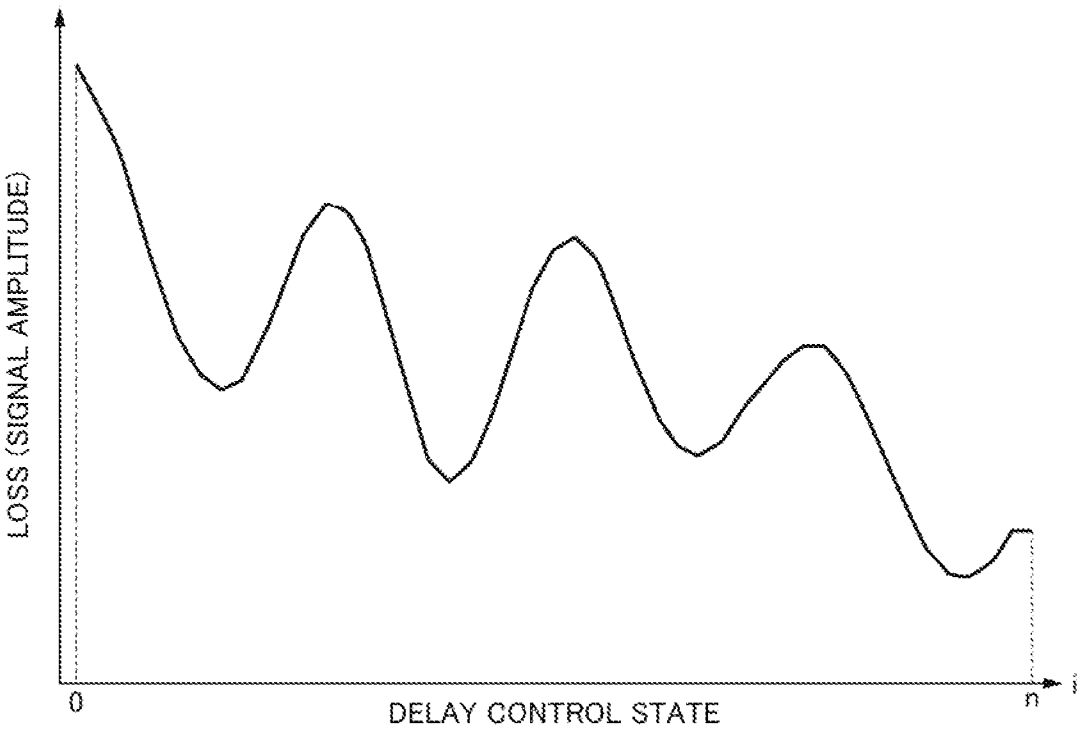
FIG. 6 is a diagram showing a signal amplitude at a first frequency in each delay control state according to the present embodiment.

FIG. 6 is a diagram showing a signal amplitude at the first frequency f1 in each delay control state. FIG. 7 is a diagram showing a signal amplitude at the second frequency f2 in each delay control state. FIG. 8 is a diagram showing a signal amplitude at the center frequency f0 (=(f1+f2)/2) of the used frequency band in each delay control state.

As shown in FIG. 6, the change in the signal amplitude at the first frequency f1 according to the delay control state shows a decreasing trend. That is, the signal amplitude at the first frequency f1 according to the delay control state generally decreases as the value of "i" increases. On the other hand, as shown in FIG. 7, the change in the signal amplitude at the second frequency f2 according to the delay control state shows an increasing trend. That is, the signal amplitude at the second frequency f2 corresponding to the delay control state generally increases as the value of "i" increases.

That is, the change in the signal amplitude at the first frequency f1 corresponding to the delay control state and the change in the signal amplitude at the second frequency f2 in the delay control state are opposite in the slope (trend) of the change. When the digital phase shifter B has electrical characteristics shown in FIGS. 6 and 7, the change in the signal amplitude at the center frequency f0 corresponding to the delay control state as shown in FIG. 8 shows substantially flat characteristics.

Therefore, in order to implement these electrical characteristics, in the digital phase shifter B, the magnitude relationship of the amplitudes of the signals S in the delay control states may be set to be different between a case where the frequency of the signal S is the first frequency f1 and a case where the frequency of the signal S is the second frequency f2. That is, in a plurality of delay control states in which each of the plurality of digital phase shift circuits connected in cascade is operated in the high-delay mode or the low-delay mode, the magnitude relationship of the amplitudes of the signals S in the delay control states may be set to be different between a case where the frequency of the signal S is the first frequency f1 and a case where the frequency of the signal S is the second frequency f2.

Also, in the digital phase shifter B, a magnitude relationship between the amplitude of the signal S when all the "n" digital phase shift circuits A are in the low-delay mode and the amplitude of the signal S when all the "n" digital phase shift circuits A are in the high-delay mode are set to be different between a case where the frequency of the signal S is the first frequency f1 and a case where the frequency of the signal S is the second frequency f2. For example, the capacitance value of the capacitor 5 and the resistance values of the first electronic switch 7*a* and the second electronic switch 7*b* are set to implement the electrical characteristics shown in FIGS. 6 to 8.

Here, in the low-delay mode, an alternating current (AC) return current flows through only the inner line. On the other hand, in the high-delay mode, an AC return current mainly flows through the outer line. That is, a path of the return current in the high-delay mode becomes longer than a current path of the return current in the low-delay mode. If the current path is lengthened, this indicates that the resistance loss increases and becomes a factor in the increased loss of the signal S in the high-delay mode.

In the digital phase shift circuit A of the present embodiment, the ground conductor 4 outside of the inner line 2 is formed in a multilayer structure of two or more layers. Thereby, the resistance value of the current path of the return current in the high-delay mode can be reduced and the signal amplitude unbalance between the high-delay mode and the low-delay mode can be reduced.

Also, in the digital phase shift circuit A of the present embodiment, a region on the outer line 3 may be formed in a multilayer structure. That is, on both or one of the first ground conductor 4*a* and the second ground conductor 4*b*, at least one of a region between the outer lines 3 and the inner lines 2 and a region on the outer lines 3 may be formed in a multilayer structure. Thereby, the resistance value of the current path of the return current in the high-delay mode can be further reduced and the signal amplitude unbalance between the high-delay mode and the low-delay mode can be further reduced.

Thus, in the present embodiment, the resistance value of the current path of the return current in the high-delay mode is reduced by forming a part of the current path of the return current in the high-delay mode in a multilayer structure. According to this configuration, it is possible to further reduce the signal amplitude unbalance between the high-delay mode and the low-delay mode.

Also, in the digital phase shift circuit A of the present embodiment, the width of the outer line 3 may be formed to be wider than the width of the inner line 2. Thereby, the resistance value of the current path of the return current in the high-delay mode can be further reduced, and the signal amplitude unbalance between the high-delay mode and the low-delay mode can be further reduced.

Also, in the digital phase shift circuit A of the present embodiment, the size of each of the first electronic switch 7*a* and the second electronic switch 7*b* may be set to be greater than or equal to a width H that is a sum of the width of the second ground conductor 4*b* and the width of the first ground conductor 4*a*. The size of each of the first electronic switch 7*a* and the second electronic switch 7*b* may be set to be greater than or equal to the width H as illustrated in FIG. 5. More preferably, the size of each of the first electronic switch a and the second electronic switch 7*b* is set to be equal to or slightly larger than the width H. Here, for example, the loss of the signal S in the low-delay mode is mainly caused by the resistance component (the on-resistance component) in the closed state of the first electronic switch 7*a* and the second electronic switch 7*b*.

Thus, in order to reduce the signal amplitude unbalance between the high-delay mode and the low-delay mode, a field effect transistor having loss equivalent to a sum of the loss due to the capacitor 5 in the high-delay mode and the resistance loss due to the current path of the return current may be used as the first electronic switch 7*a* and the second electronic switch 7*b*. There is a correlation between a resistance value and a channel width of the field effect transistor, i.e., a size of the field effect transistor. For example, when the size of the field effect transistor becomes the width H, the resistance loss due to the field effect transistor is substantially equivalent to the sum of the loss due to the capacitor S in the high-delay mode and the resistance loss of the return current path.

Also, in the digital phase shifter B of the present embodiment, the magnitude relationship of the amplitudes of the signals S that change with the control states of the operation modes of the plurality of digital phase shift circuits A may be set to be different between a case where the frequency of the signal S is the first frequency f1 and a case where the frequency of the signal S is the second frequency f2.

Also, in the digital phase shifter B, the magnitude relationship between the amplitude of the signal S when all the "n" digital phase shift circuits A are in the low-delay mode and the amplitude of the signal S when all the "n" digital phase shift circuits A are in the high-delay mode may be set to be different between a case where the frequency of the signal S is the first frequency f1 and a case where the frequency of the signal S is the second frequency f2.

According to this configuration, the dependence of the delay control state in the change in the amplitude of the signal S can be substantially flattened at the center frequency of the use frequency band and the amplitude fluctuation at the first frequency f1 and the second frequency f2 where the amplitude fluctuation is maximized can be minimized. As a result, it is possible to suppress a change in the amplitude of the signal S in the used frequency band.

The digital phase shift circuit A may include the third electronic switch 7*c* connected between the signal line 1 and the first ground conductor 4*a* or the second ground conductor 4*b*. For example, in the low-delay mode, the loss of the signal line 1 is intentionally increased by setting the third electronic switch 7*c* in the closed state (ON state). This loss is given to make the loss given to the high-frequency signal in the low-delay mode substantially equal to the loss given to the high-frequency signal in the high-delay mode. For example, in the high-delay mode, the third electronic switch 7*c* is set in the open state (OFF state) and therefore no action is taken to intentionally increase the loss of the signal line 1. As a result, the loss given to the high-frequency signal in the high-delay mode is substantially the same as the loss given to the high-frequency signal in the low-delay mode.

Although the present invention has been described based on preferred embodiments, the present invention is not limited to the above-described embodiments and various modifications can be made without departing from the scope of the present invention.

For example, in the digital phase shift circuit A according to the present embodiment, the region on the outer line 3 may be formed in a multilayer structure.

REFERENCE SIGNS LIST

1 Signal line
2 Inner line
2*a* First inner line
2*b* Second inner line
3 Outer line
3*a* First outer line
3*b* Second outer line
4 Ground conductor
4*a* First ground conductor
4*b* Second ground conductor
5 Capacitor
6 Connection conductor
7 Electronic switch
7*a* First electronic switch
7*b* Second electronic switch
7*d* Fourth electronic switch
8 Switch controller

The invention claimed is:

1. A digital phase shift circuit comprising:

a signal line extending in a predetermined direction;

two inner lines arranged to be separated from the signal line by a predetermined distance at both one side and the other side of the signal line;

two outer lines provided at positions farther from the signal line than the inner lines at both the one side and the other side of the signal line;

a first ground conductor electrically connected to one ends of the inner lines and the outer lines in the predetermined direction;

a second ground conductor electrically connected to the other ends of the outer lines in the predetermined direction;

a first electronic switch connected between the other end of the inner line at the one side in the predetermined direction and the second ground conductor; and a second electronic switch connected between the other end of the inner line at the other side in the predetermined direction and the second ground conductor, wherein, on a region between the outer line and the inner line, at least one of the first ground conductor and the second ground conductor has a multilayer structure.

2. The digital phase shift circuit according to claim 1, wherein wherein the inner lines, the outer lines, and uppermost layer of the at least one of the first ground conductor and the second ground conductor of the multilayer structure are connected in the same layer.

3. The digital phase shift circuit according to claim 1, wherein a width of the outer line is wider than a width of the inner line.

4. A digital phase shifter in which a plurality of digital phase shift circuits according to claim 1 are connected in cascade and the plurality of digital phase shift circuits connected in cascade perform a phase shift process for a signal of a frequency band from a first frequency to a second frequency higher than the first frequency, wherein the each of the digital phase shift circuits operates in an operation mode that is one of a low-delay mode in which the first electronic switch and the second electronic switch are set in a closed state and a high-delay mode in which the first electronic switch and the second electronic switch are set in an open state, and wherein a magnitude relationship between an amplitude of the signal when all the digital phase shift circuits are in the low-delay mode and an amplitude of the signal when all the digital phase shift circuits are in the high-delay mode is different between a case where the frequency band of the signal is the first frequency and a case where the frequency band of the signal is the second frequency.

5. The digital phase shift circuit according to claim 1, wherein the first electronic switch and the second electronic switch are field effect transistors, and wherein a size of a size of each of the field effect transistors is greater than or equal to a sum of a width of the first ground conductor and a width of the second ground conductor.

6. The digital phase shift circuit according to claim 1, further comprising a third electronic switch connected between the signal line and the first ground conductor or the second ground conductor.

7. The digital phase shift circuit according to claim 1, further comprising:

a capacitor connected between the signal line and the first ground conductor or the second ground conductor; and a fourth electronic switch connected in series to the capacitor between the signal line and the second ground conductor.

8. A digital phase shifter in which a plurality of digital phase shift circuits according to claim 1 are connected in cascade and the plurality of digital phase shift circuits connected in cascade perform a phase shift process for a signal of a frequency band from a first frequency to a second frequency higher than the first frequency, wherein the each of the digital phase shift circuits operates in an operation mode that is one of a low-delay mode in which the first electronic switch and the second electronic switch are set in a closed state and a high-delay mode in which the first electronic switch and the second electronic switch are set in an open state, and wherein, in delay control states for operating each of the plurality of digital phase shift circuits connected in cascade in the high-delay mode or the low-delay mode, a magnitude relationship between signal amplitudes of the delay control states is different between a case where the frequency band of the signal is the first frequency and a case where the frequency of the signal is the second frequency wherein each of the delay control states indicates how many of the plurality of digital phase shift circuits connected in cascade from a first digital phase shift circuit of the plurality of digital phase shift circuits is in the high-delay mode or the low-delay mode.

* * * * *